US011624689B2

(12) United States Patent
Perrone et al.

(10) Patent No.: US 11,624,689 B2
(45) Date of Patent: Apr. 11, 2023

(54) ASSEMBLY FOR FOPS TEST

(71) Applicant: CNH Industrial America LLC, New Holland, PA (US)

(72) Inventors: Vincenzo Perrone, Modena (IT); Andrea Soffritti, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/288,389

(22) PCT Filed: Oct. 22, 2019

(86) PCT No.: PCT/EP2019/078718
§ 371 (c)(1),
(2) Date: Apr. 23, 2021

(87) PCT Pub. No.: WO2020/083906
PCT Pub. Date: Apr. 30, 2020

(65) Prior Publication Data

US 2021/0381941 A1 Dec. 9, 2021

(30) Foreign Application Priority Data

Oct. 23, 2018 (IT) ........................ 102018000009718

(51) Int. Cl.
*G01N 3/303* (2006.01)
*G01N 3/06* (2006.01)

(52) U.S. Cl.
CPC ............ *G01N 3/303* (2013.01); *G01N 3/066* (2013.01)

(58) Field of Classification Search
CPC ............ G01N 3/30; G01N 3/303; G01N 3/48
See application file for complete search history.

(56) References Cited

U.S. PATENT DOCUMENTS 1,901,460 A * 3/1933 Lewis .................... G01N 3/303 73/12.13
4,505,362 A * 3/1985 Layotte .................. G01V 1/147 188/67
2017/0176308 A1* 6/2017 Koning .................. G01M 7/08

FOREIGN PATENT DOCUMENTS

CN 203148797 U * 8/2013

* cited by examiner

*Primary Examiner* — Erika J. Villaluna
(74) *Attorney, Agent, or Firm* — Rickard K. DeMille; Rebecca L. Henkel

(57) ABSTRACT

A falling-object protective structures (FOPS) test assembly for carrying a FOPS test of a wall of cab of a heavy vehicle is configured to releasably carry a test ball for the FOPS test above a predefined distance above wall. The FOPS test assembly defines a closed path for test ball from its housing position to wall, and includes a handling means configured to assume a first condition in which they do not interfere with the passage of test ball through the closed path when ball passes through closed path in a first direction and a second condition in which handling means lock and hold test ball within the closed path once test ball passes again through the closed path in a second direction opposite to the first direction.

8 Claims, 4 Drawing Sheets

5
6
37
36
2
9
7
8
11
19a
19
17
16
16
1
18
16
18
18
19
19b
17
4

19
17
19c
31
31
3
22
22
21
34
34
R
19d

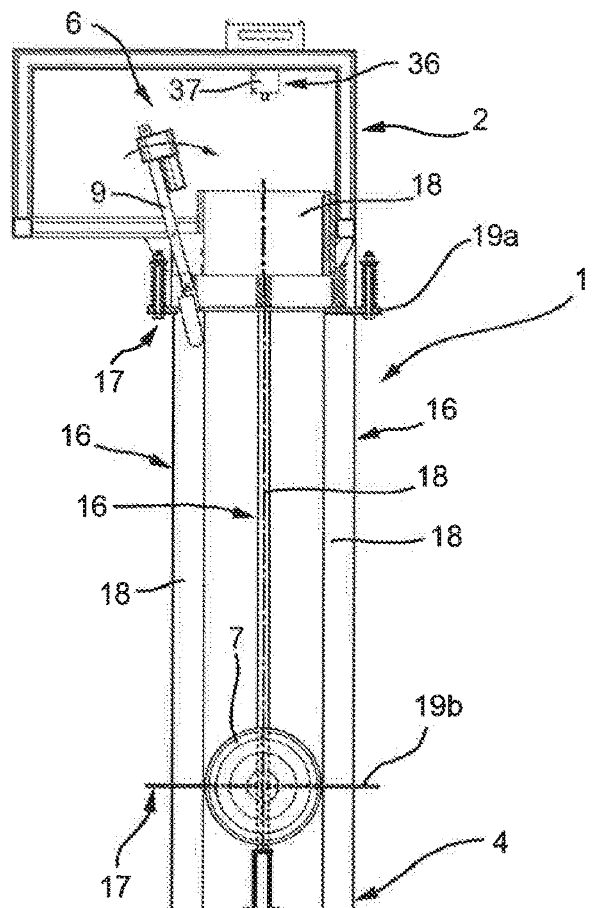
FIG. 5
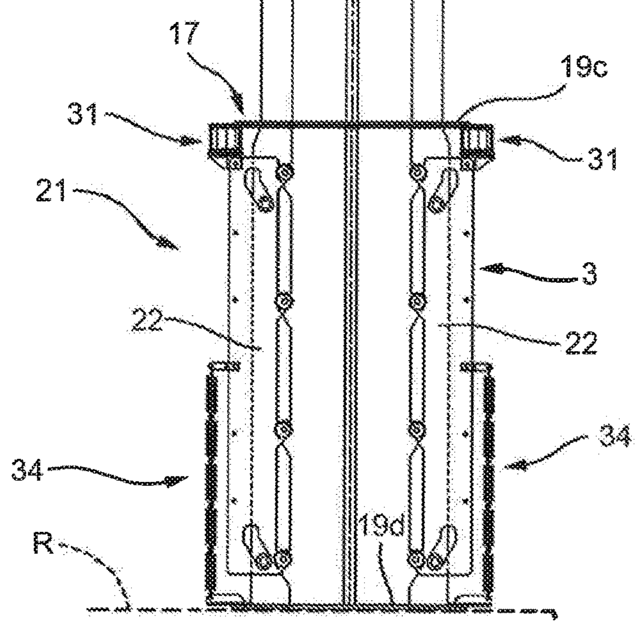

ASSEMBLY FOR FOPS TEST

CROSS REFERENCE TO RELATED APPLICATIONS

This application is a U.S. National Stage filing of International Application Serial No. PCT/EP2019/078718 entitled "ASSEMBLY FOR FOPS TEST," filed Oct. 22, 2019, which claims priority to Italian Application Serial No. 102018000009718, filed Oct. 23, 2018, each of which is incorporated by reference herein in its entirety for all purposes.

TECHNICAL FIELD

The present invention concerns a test assembly, in particular an assembly for conducting FOPS (Falling-Object Protective Structures) test for testing roofs of heavy vehicles such as roof of tractor's cab.

BACKGROUND OF THE INVENTION

A cab of heavy vehicles such as tractors needs to be tested to resist to a load falling on its roof; indeed, during working conditions, it is possible that a load may fall on the roof of the cabin and that it could make serious harm to the driver of the vehicle which is placed inside the cab.

Moreover, since cab walls and roof are normally made of polymeric material, such need is greatly felt for vehicles which must work in very cold environmental conditions. Indeed, if temperatures are low, polymeric material normally become greatly fragile and may collapse even subject to very low load conditions.

In order to provide to the consumers vehicles comprising safe cabs for all environmental conditions, a standard test for cab has been established; such test is known as FOPS, i.e. Falling-Object Protective Structures, which is described in detail in ISO 3449:2009.

Briefly, such test foresees the presence of a metallic ball of around 40 kg suspended 3 meters above the roof level of the cab of a heavy vehicle placed in a environment having a −20° C. temperature. The ball is then released to fall freely by gravity on the roof of the vehicle following a first direction. If the ball rebounds on the roof, the test is passed; if the roof collapses the test is obviously not passed.

However, such test it not easily operable because of the following.

First, to achieve the needed temperature, the test should be conducted in a closed and refrigerated room. However, if the test is successful, the ball will rebound and could damage the walls/pavement of such room or other instrumentations in this latter.

Moreover, if the text is made outdoor by using a previously refrigerated cab, the temperature of the cab cannot precisely set at −20° C. during the moment of the test because the outdoor temperature is surely higher; further, in presence of wind, this latter may impart a transversal load to the metallic ball which could not hit a predefined test point on the roof.

Further, in general, the ball is released to fall on the roof freely without any control of the exact height and positioning with respect to the roof.

Again, in general, if the test is successful, both outdoor or indoor, the ball will rebound and could harm peoples which are conducting such test.

In view of the above, the need is felt to increase the precision and the safety of a FOPS test for a cab of a heavy vehicle.

An aim of the present invention is to satisfy the above mentioned needs.

SUMMARY OF THE INVENTION

The aforementioned aim is reached by a FOPS test assembly as claimed in the appended set of claims.

BRIEF DESCRIPTION OF DRAWINGS

For a better understanding of the present invention, a preferred embodiment is described in the following, by way of a non-limiting example, with reference to the attached drawings wherein:

FIG. 5 is a lateral side view of the FOPS test assembly of FIG. 1 in a different operative condition.

DETAILED DESCRIPTION OF THE INVENTION

Figure 1:
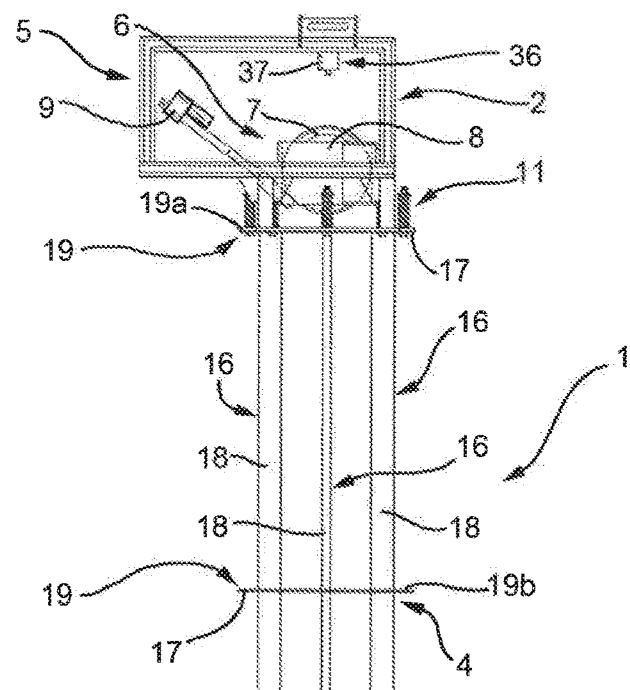
FIG. 1 is a lateral side view of a FOPS test assembly according to the invention.

General reference number 1 discloses a FOPS test assembly for conducting a FOPS test according to the present invention.

As disclosed in FIG. 1, assembly 1 essentially comprises an upper portion 2 configured to be connected to a carrying structure, an intermediate portion 4, carried by upper portion 2 and defining a closed path, as described below, for said FOPS test and a lower portion 3, carried by intermediate portion 4 in a terminal lower position of this latter.

Figure 2:
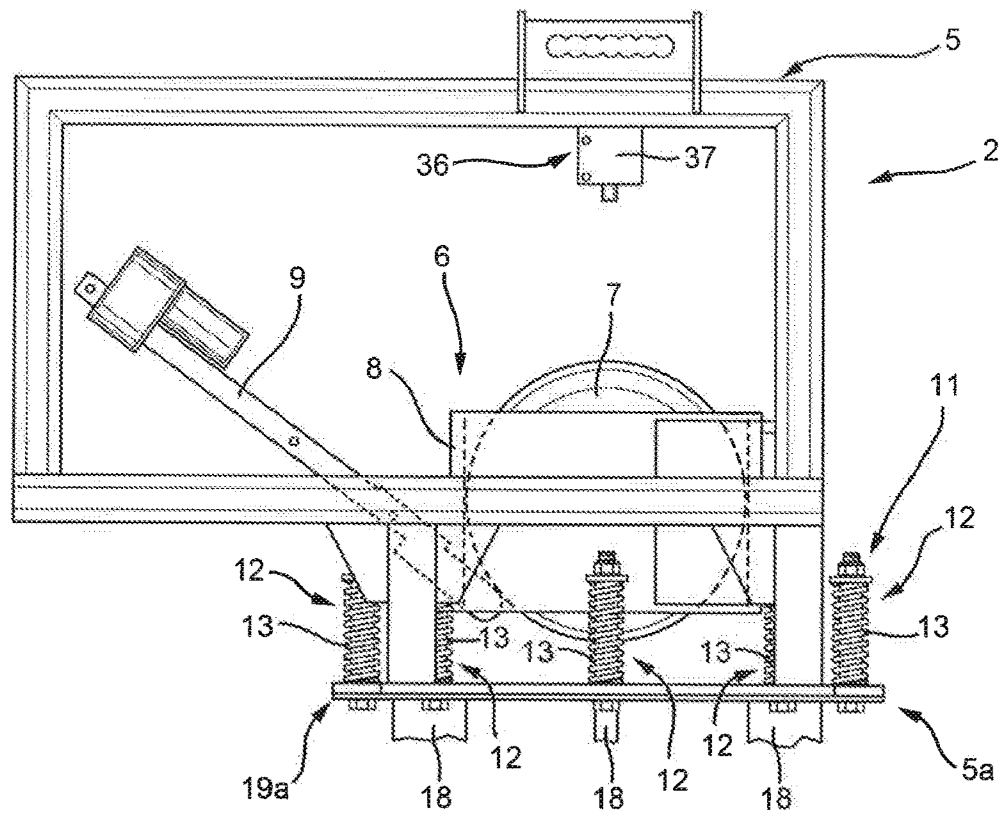
FIG. 2 is a lateral side view of a upper portion of the FOPS test assembly of FIG. 1.
Figure 3:
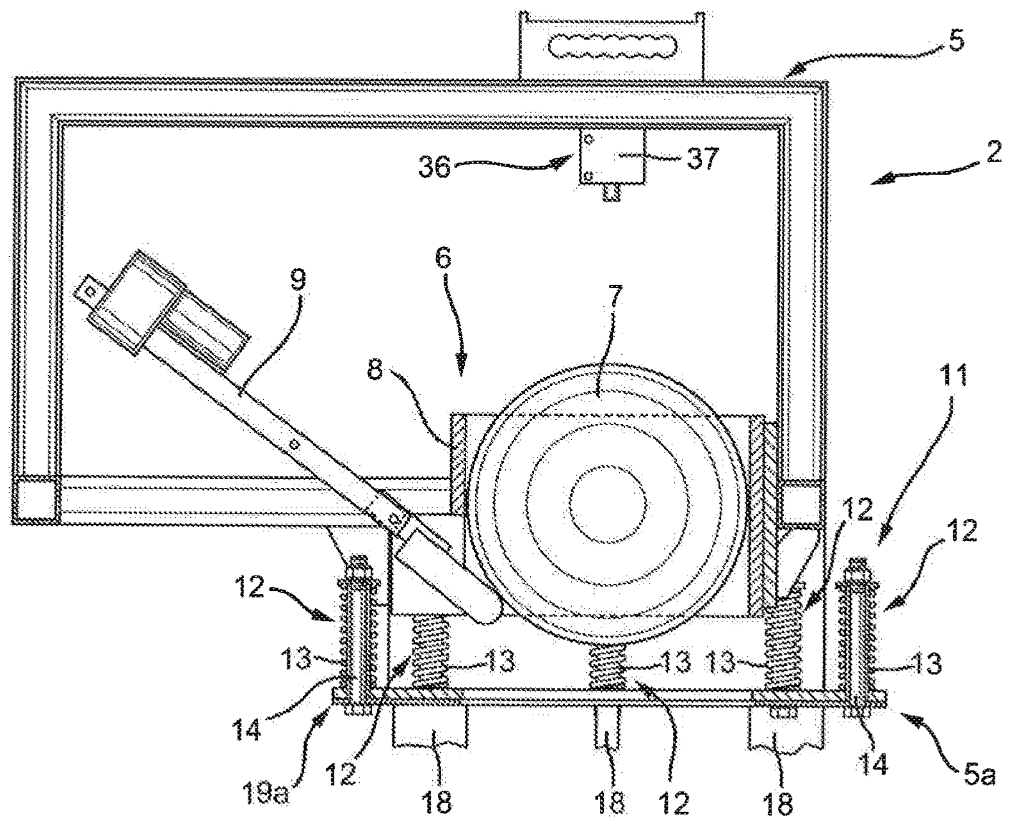
FIG. 3 is a section view of the portion of FIG. 2.
Figures 4, 6:
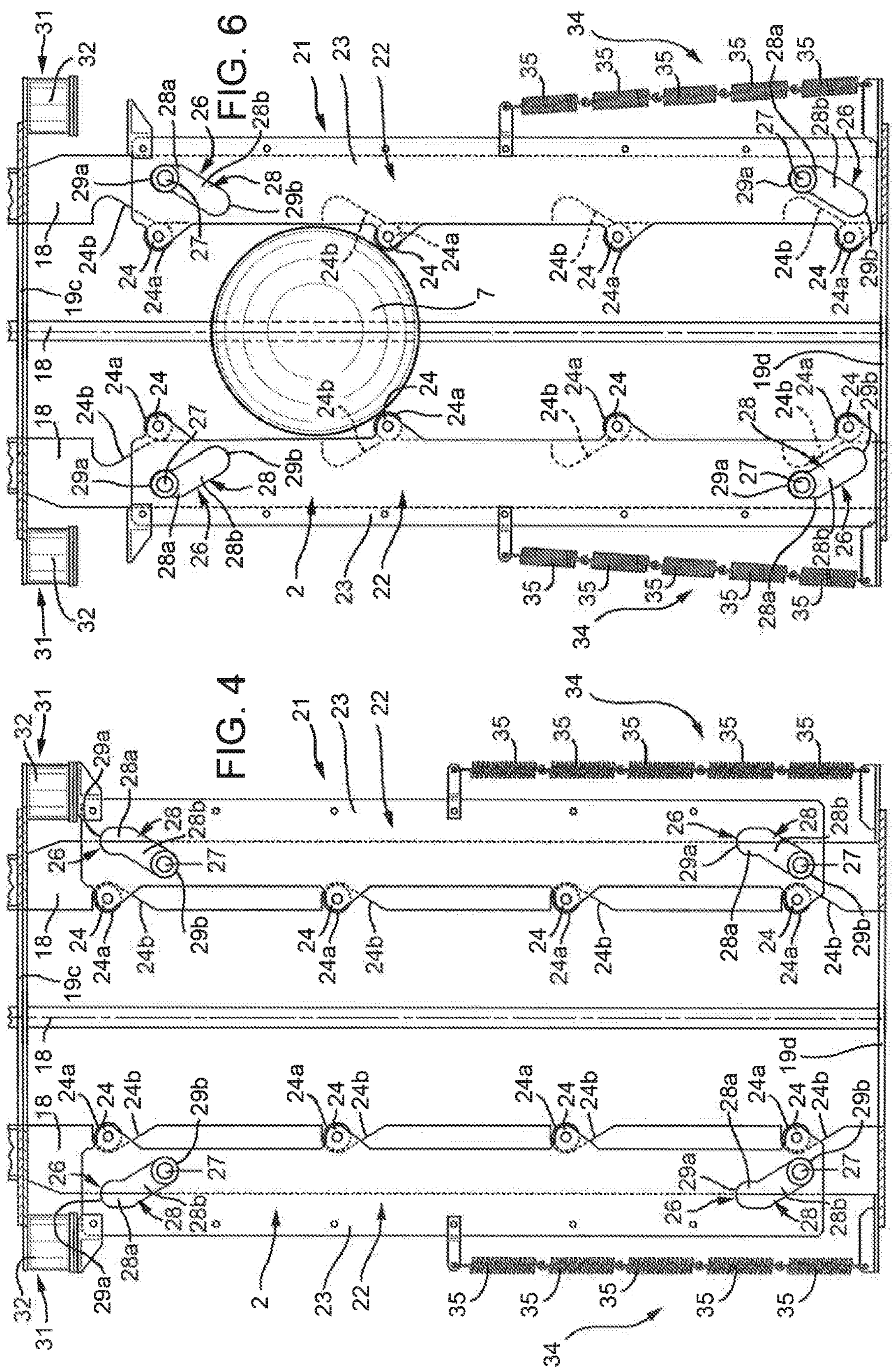
FIG. 4 is a lateral side view of a lower portion of the FOPS test assembly of FIG. 1.
FIG. 6 is a lateral side view of the portion of FIG. 4 in a second operative condition.

In particular, making reference to FIGS. 2 and 3, upper portion 2 comprises a structural frame 5, preferably having a substantial parallelepiped shape, configured to be connected to a carrying structure such as a bridge crane moving in a conditioned indoor space.

Upper portion 2 further comprises releasably housing means 6 for housing a test ball 7 for carrying a FOPS test, i.e. a metallic ball of a mass of 40 Kg. According to the described embodiment, such releasably housing means 6 comprise a hollow cylindrical member 8 sized to house test ball 7 and a linear actuator 9, hinged with respect to frame 5 and configure to assume a first position in which it cooperates to contact test ball 7 maintaining this latter in member 8 and a second position in which it allows the movement of test ball 7 down out of member 8.

Intermediate portion 4 is connected to a lower side of frame 5 thanks to a movable connection 11, in particular allowing at least a vertical movement with respect to frame 5. According to the described embodiment, such movable connection 11 comprise a plurality of pins 14 which can pass through and freely with respect to an element fixed to frame 5, e.g. a flange 5$a$, and respective elastic means 12, e.g. compression coil springs 13, interposed between each pin 14 and flange 5$a$. In particular, pin 14 comprises a lower terminal portion fixed to intermediate portion, a free upper terminal portion and an intermediate portion moving into a hole realized in flange 5*a*. Elastic means 12 are interposed with respect to free upper terminal portions of pin 14 and flange 5*a*. According to such exemplificative construction, intermediate portion 4 may move vertically with respect to frame 5, guided by pin 14 passing through flange 5*a* and dampened thanks to elastic means 12.

Intermediate portion 4 defines a closed path for free gravitational fall of test ball 7 through assembly 1, advantageously a cylindrical path along a vertical axis A of about 3 meters. According to the described embodiment intermediate portion 4 comprises a plurality of vertical members 16 equally spaced circumferentially around the aforementioned axis A and a plurality of transversal members connecting vertical members together. Both vertical members 16 and transversal members 17 defines an inner diameter being greater than the diameter of test ball 7 so as to allow its free fall through the closed path.

In particular, according to the described configuration, vertical members 16 comprise rectangular cross section metallic rods 18 which are in number of four, spaced circumferentially of 90° with respect to each other with respect to axis A while transversal members 17 comprise annular metallic plates 19 fixedly connected, e.g. by welding, to vertical members 16. The inner diameter defined between rods 18 and the inner diameter of annular plates 19 is bigger than the diameter of test ball 7, as said above. Preferably transversal members 17 comprise four annular plates 19, in particular an upper, a lower and two intermediate annular plates 19*a*, 19*d*, 19*b* and 19*c*.

According to the aforementioned structure of movable connection 11, lower terminal portion of pins 14 is fixed to the upper annular plate 19*a*, positioned to an upper terminal edge of rods 18. Advantageously, a first intermediate annular plate 19*c* is positioned above lower portion 3 and a second intermediate annular plate 19*b* is positioned so as to confer to intermediate portion 4 an adequate stiffness, in a position between upper and first annular intermediate plates 19*a*, 19*c*. Lower annular plate 19*d* is placed in a lower terminal edge of rods 18, below lower portion 3.

Lower portion 3 essentially comprises handling means 21 configured to allow the passage of test ball 7 through intermediate portion 4 when this latter moves along axis A in a first direction concordant with gravity, and to lock and handle the test ball 7 when this latter passes again along axis A but in a second direction opposite to the first direction, namely against gravity.

In particular, according to the described embodiment, handling means 21 comprises mechanical handling means configured to assume a first position configured to not interfere with the movement of test ball 7 and a second position configured to lock and handle test ball 7.

According to the exemplary embodiment, mechanical handling means comprises at least a lock plate 22, carried in a movable way by vertical members 16. According to the described configuration, mechanical handling means comprises a right and a left lock plates 22, carried by respective opposed vertical members 16, i.e. 180° placed around axis A to each other.

Making reference to only one of the above mentioned lock plates, e.g. right lock plate, for sake of simplicity, lock plate 22 comprises a main portion 23, being preferably a rectangular metallic plate, and at least a protrusion 24 extending from main portion 23, in particular a protrusion 24 extending from main longitudinal side of main portion 23 towards axis A in a plane parallel to both rod 18. Advantageously, lock plate 22 comprises a plurality of protrusions along the side of main portion 23, e.g. four protrusions equally spaced to each other, preferably at a distance of 250 mm to each other.

Main portion 23 and protrusion 24 are movably carried by the respective rod so that, in a first operative position of lock plate 22, protrusion 24 are placed at least to equal distance to axis A of inner edge of rods 18 and, in a second operative position of lock plate 22, protrusion 24 extend inside the inner diameter defined by inner edge of rods 18 and annular plates 19.

Advantageously, each protrusion 24 may further carry a roller 24*a* hinged to the protrusion itself and consequently main portion 23 may comprise a notch 24*b* configured to allow the movement of the roller between the first and second operative positions.

Lock plate 22 may be connected in a movable manner to the respective rod 18 via a cam 26 comprising a pin 27 carried by preferably rod 18 cooperating with a guide 28 realized preferably in main portion 23 of lock plate 22. In particular guide 28 comprises an upper vertical portion 28*a* starting from an upper edge 29*a* of guide 29 and an inclined portion 28*b*, starting from the lower part of upper vertical portion 28*a* and directed, inclined, to axis A and ending into a lower edge 29*b*.

In this way, in first operative position of lock plate 22, pin 27 is placed in guide 28 so that it is in contact with lower edge 29*b* and, as said, protrusion 24 do not extend inside the inner diameter and, in second operative position of lock plate 22, pin 27 is placed in guide 28 so that it is in contact with upper edge 29*a* and, as said, protrusion 24 extend inside the inner diameter.

Handling means 21 may further comprise drive means 31 configured to control movement of lock plate 22 from its first to its second operative position, i.e. so that pin 27 may pass to cooperate from lower to upped edges 29*a*, 29*b* of guide 28.

According to the described embodiment, drive means 31 comprises magnetic means 32, configured to assume a first status, charged so as to generate a magnetic force, in which they maintain lock plates 22 so that pin 27 cooperates with lower edge 29*a* of guide 28 and a second status, uncharged, in which they release lock plates 22 so that pin 27 cooperates with upper edge 29*b* of guide 28.

Preferably, handling means 21 may further comprise preload means 34 configured to generate a load configured to bright quicker mechanical handling means, i.e. lock plate 22, from first to second operative position.

According to the described embodiment, preload means 34 comprise elastic means 35, e.g. a plurality of compression coils springs in series one to the other, interposed between main portion 23 of lock plate 22 and lower annular plate 19*d*. Elastic means 35 exerts a force on lock plate 22 configured to bring this latter in its second position.

Assembly 1 further comprises measure means 36 configured to detect the distance and/or velocity of test ball 7, when released, with respect to a fixed point, e.g. from frame 5. According to the described embodiment measure means 36 comprises optical means such as a laser detector 37, carried by frame 5 and configured to calculate, in known way, the distance of test ball 7 via a laser source. Preferably laser detector 36 is carried by frame 5 coaxial to axis A.

Assembly 1 may further comprise centering means (not shown), carried by one of upper, intermediate or lower portions 2, 3, 4 and configured to visualize the position of collision point of test ball 7 when released. Such centering means may comprise a laser source, not shown, configured to project on the roof of the cabine the collision position of the test ball 7.

Assembly 1 may further comprise a winch, not shown, carried by upper portion 2 and configured to pull up test ball 7, when released, up to be housed inside to cylindrical housing 8. To this aim, as known, winch comprise a male threaded element configured to insert in a female threaded hole realized in test ball 7.

Assembly 1 may further comprise visualization means, not shown, e.g. a display, configured to show some physical quantity related to the test, e.g. distance of the test ball 7 with respect to the roof of the cab.

Assembly 1 further comprises an electronic unit, electrically connected, by wire or electromagnetically, to at least measure means 36 and to drive means 31. Such electronic unit may be further connected to releasably housing means 6 and/or to winch and/or to visualization means. Electronic unit comprises memorizing means and elaboration means configured to store and elaborate data related to the FOPS test realized thanks to assembly 1. In particular electronic unit is configured to detect instant position and velocity of test ball 7 via measure means 36 and to move handling means 21 via drive means 31 in function of the position and/or velocity of such test ball 7 inside the closed path defined by intermediate portion 4.

The operation of the described FOPS test assembly 1 according to the invention is the following.

In an initial condition, disclosed according to FIG. 1, test ball 7 is housed inside cylindrical housing 8 because linear actuator 9 do not allow its fall through cylindrical housing 8. In such condition, lock plate 22 are positioned in their first operative condition. Assembly 1 is positioned to reach a predetermined position above a roof R of a cabin of a heavy vehicle, e.g. thanks to centering means, and so that test ball 7 is positioned at 3 meters with respect to roof R and the distance between lower annular plate 19*d* and roof R is lower than the diameter of test ball 7.

Then, when assembly 7 is correctly positioned above roof R, the user may, manually or, preferably, electronically, control linear actuator 9 to allow the fall of test ball 7 through housing 8 by gravity (FIG. 5). In such condition, test ball 7 falls along the closed path in a first direction and measure means 36 continuously detect distance and/or velocity of test ball 7. Test ball 7 will then collide with roof R and will rebound inside closed path in the second direction which is opposite to the first direction and so against gravity.

During all the movement of test ball 7, measure means 36 detect position and/or velocity of this latter and communicate such position and/or velocity data to electronic unit. When test ball 7 reach a predefined velocity, e.g. a zero m/s velocity corresponding to top height of rebound of test ball 7, or a predefined height, e.g. a foreseen height of maximum rebound of test ball 7 in function of its impact speed, electronic unit control handling means 21 so as to lock and handle test ball 7. In particular, according to the above configuration, electronic control unit control drive means 31 to release lock plate 22. In this way, following cam 26 and recalled by preload means 34, main portion 23 moves so that protrusions 24 are positioned inside the inner diameter defined by vertical and transversal members 16, 17. In this way, test ball 7, starting to fall again, will impact into the nearest protrusion 24 and will be hold by this latter. Since the distance between protrusion is about 250 mm, this could be the maximum distance that test ball 7 could fall again and therefore the structure is dimensioned to resist to such maximum impact force of test ball 7 with protrusion 24. Such impact is moreover dampened thanks to elastic means 15 of connection 11.

Then, test ball 7 could be bring again into releasably housing means 6, e.g. thanks to a winch, and assembly 1 can be used for testing a new cab simply by positioning correctly again assembly 1 with respect to such cab. The present invention is also related to a method for executing a FOPS test.

Such method comprises the following steps:

positioning a test ball 7 at a predefined distance above a wall R of a cabin;

allowing test ball 7 falling along a closed path in a first direction defined by assembly 1;

once test ball 7 passes again in the closed path in a second direction opposite to the first direction, and once test ball 7 reaches a predefined velocity and/or position, locking and handling test ball 7 in assembly 1.

Preferably the predefined velocity is a zero m/s velocity of said rebounded test ball 7 and the predefined position is a maximum rebound height which is calculate by the electronic unit in function of the velocity of impact of test ball 7 on roof R.

In view of the foregoing, the advantages of a FOPS test assembly 1 according to the invention are apparent.

First, assembly 1 allows to carry out a safe and precise FOPS test thanks to the closed path defined by intermediate portion 4 and handling means 21 which lock and handle test ball 7, once rebounded on roof R, into the closed path.

Since the test ball 7 is kept in a safe position, the test may be realized in a refrigerated environment, thereby facilitating to maintain cab of the vehicle at a predefined temperature. Moreover, an indoor refrigerated environment allows to make a more precise test, since no wind or other external perturbation may lead to a change of trajectory of the test ball.

Moreover, the use of a control unit and a related display for showing test-related values and the presence of centering means allow the user to monitor clearly how and where the test ball 7 reach the roof R of the cabin.

Further, handling means 21, more particularly the disclosed structure, allow a simple, strong and quick way to lock and handle the test ball 7 within the closed path defined by assembly 1.

Assembly 1 has, generally, a simple structure which may be varied according to test ball 7 dimension, if necessary, and which may be carried in the indoor environment in a simple way, thereby allowing to use such assembly, modifying size of the elements of upper, intermediate and lower portions 2, 3, 4 for testing all typologies of cabin.

Additionally, the use of a closed path improves the safety of the worker which are making the test around assembly 1 itself.

It is clear that modifications can be made to the described FOPS test assembly 1 which do not extend beyond the scope of protection defined by the claims.

Indeed, shape and composition of upper, intermediate and lower portions 2, 3, 4 may vary such as shape and composition of movable connection 11, or releasably housing means 6 or vertical and transversal members 16, 17.

Handling means 21 may be of every typology, e.g. magnetic handling means or other typology of mechanic handling means configured to lock and handle, when necessary, test ball 7.

Similarly, drive means 31 may be realized in any other way, e.g. mechanically or hydraulically.

Further, as said, centering means, winch or preload means 34 may be absent or, if present, realized in any different equivalent way.

The invention claimed is:

1. A falling-object protective structures (FOPS) test assembly for carrying out a FOPS test of a wall of a cab of a heavy vehicle, the assembly being configured to releasably carry a test ball for the FOPS test above a predefined distance above the wall and defining a closed path for the test ball from its housing position to the wall, the assembly comprising:

handling means configured to assume a first condition for allowing the passage of the test ball through the closed path when the ball passes through the closed path in a first direction and to assume a second condition for locking and holding the test ball within the closed path once the test ball passes again through the closed path in a second direction opposite to the first direction;

an upper portion configured to be carried by an external carrying structure and comprising releasably housing means for releasably housing the test ball;

an intermediate portion carried by a movable manner connection to the upper portion and defining the closed path, wherein the movable manner connection comprises an elastic means interposed between the upper portion and the intermediate portion, and wherein the intermediate portion comprises vertical members and transversal members fixedly connected to the plurality of vertical members, the vertical and transversal members defining the closed path, the closed path being cylindrical and extending vertically coaxial to an axis and having an inner diameter greater than a diameter of the test ball; and a lower portion, carried by the intermediate portion, the lower portion comprising the handling means, wherein the handling means comprises a lock element carried in a movable manner with respect to one of the vertical or transversal members, the lock element comprising a main portion realizing the movable manner connection with the members and a protrusion, the lock element being sized so as to assume a first position with respect to the members in which the protrusions do not extend into the closed path and a second position in which the protrusion extend into the closed path to cooperate to contact the test ball.

2. The FOPS test assembly according to claim 1, wherein the handling means is a mechanical handling means.

3. The FOPS test assembly according to claim 1, further comprising a drive means configured to operate the handling means from the first condition to the second condition.

4. The FOPS test assembly according to claim 3, wherein the lock element is metallic and the drive means comprises a magnetic element configured to be charged or uncharged to maintain the lock element respectively into the first or second operative position, respectively.

5. The FOPS test assembly according to claim 4, further comprising preload means configured to exert a supplemental force on the lock element to force lock element to pass from its first to its second position.

6. The FOPS test assembly according claim 1, further comprising a measure means configured to detect at least one of a position and a velocity of the test ball along the closed path.

7. The FOPS test assembly according to claim 6, wherein the measure means comprises a laser detector.

8. The FOPS test assembly according to claim 1, wherein the lock plate comprise a plurality of protrusions, each of the protrusions being spaced apart from each other of at maximum of 250 mm.

* * * * *